United States Patent
Severinski et al.

[11] Patent Number: 5,845,966
[45] Date of Patent: Dec. 8, 1998

[54] VEHICLE SIDE IMPACT AIR BAG ASSEMBLY

[75] Inventors: Paul Severinski, Southgate; Linda M. Makowski, St. Clair, both of Mich.

[73] Assignee: Lear Corporation, Southfield, Mich.

[21] Appl. No.: 587,069

[22] Filed: Jan. 16, 1996

[51] Int. Cl.⁶ .............................. B60R 21/00; A47C 7/02
[52] U.S. Cl. .................. 297/216.13; 297/452.38
[58] Field of Search ................ 297/452.58, 452.41, 297/452.38, 216.13, 216.14, 216.1, DIG. 3; 280/728.1, 730.1, 730.2, 730 A

[56] References Cited

U.S. PATENT DOCUMENTS

| | | |
|---|---|---|
| 3,669,499 | 6/1972 | Semplonius et al. . |
| 4,637,650 | 1/1987 | Inoue . |
| 4,643,480 | 2/1987 | Morita . |
| 4,786,103 | 11/1988 | Selbert . |
| 4,867,507 | 9/1989 | Arai . |
| 5,009,469 | 4/1991 | Mouri . |
| 5,112,079 | 5/1992 | Haland et al. . |
| 5,248,356 | 9/1993 | Shimada . |
| 5,348,342 | 9/1994 | Haland et al. . |
| 5,364,170 | 11/1994 | West . |
| 5,419,579 | 5/1995 | McPherson et al. . |
| 5,503,428 | 4/1996 | Awotwi et al. . |
| 5,601,332 | 2/1997 | Schultz et al. . |
| 5,651,582 | 7/1997 | Nakano . |
| 5,667,242 | 9/1997 | Slack et al. . |

Primary Examiner—Milton Nelson, Jr.
Attorney, Agent, or Firm—MacMillian, Sobanski & Todd, LLC

[57] ABSTRACT

A vehicle seat assembly (10) including a side impact air bag module (40) mounted to one of the side bolsters (32,34) of a seat back (14). The seat back (14) having a layer of foam cushion (24) encased by a trim cover (26) and an opening (38) therein for receiving the air bag module (40). A trim ring (46) includes a flange (50) extending partially into the opening (38) and a lip (48) fixedly secured to the trim cover (26) around the perimeter of the opening (38) to provide a rigid entrance to receive and facilitate mounting of the air bag module (40) to the seat back (14).

20 Claims, 4 Drawing Sheets

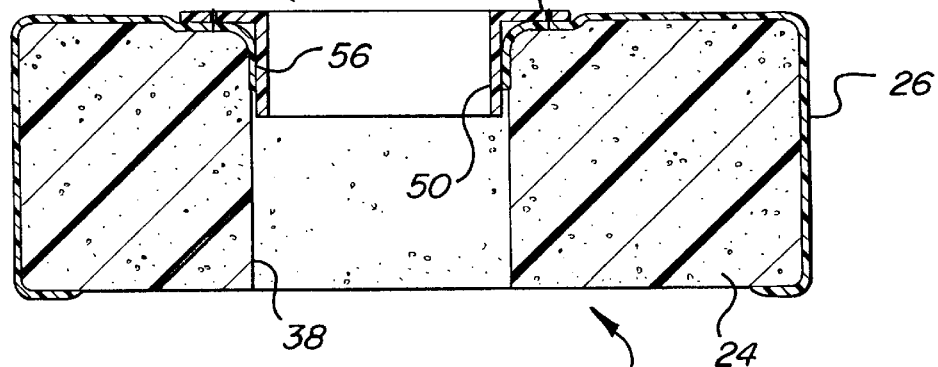
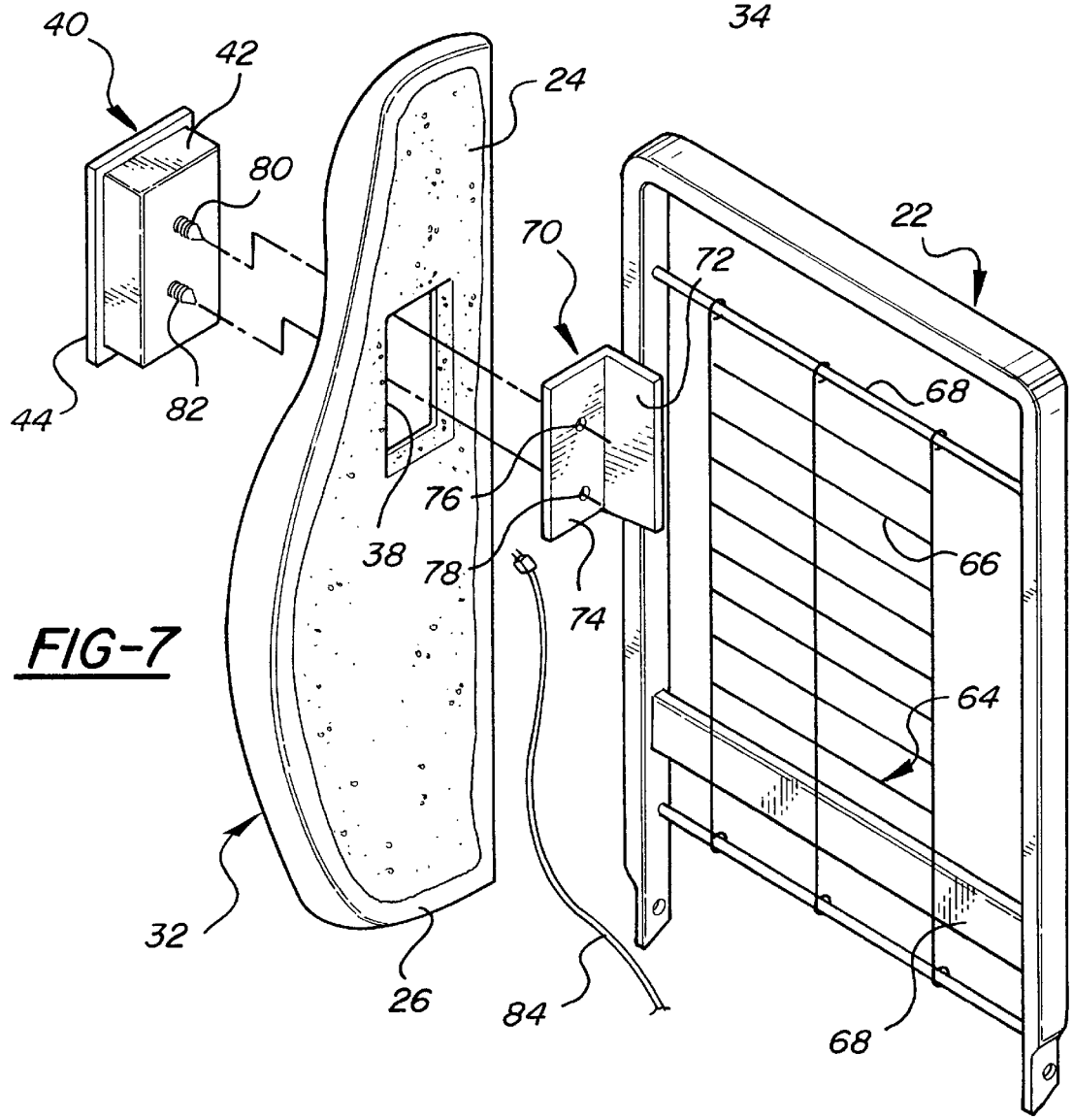

VEHICLE SIDE IMPACT AIR BAG ASSEMBLY

TECHNICAL FIELD

The subject invention relates generally to a vehicle seat assembly having a side impact air bag module and, more particularly, to a trim ring for providing a rigid opening for receiving and facilitating mounting of the air bag module to the seat assembly.

BACKGROUND OF THE INVENTION

It is becoming increasing important to provide vehicle seat occupants protection during a side impact collision by use of side impact air bag assemblies mounted to the side bolster section of the vehicle seat or in the interior door panel of the vehicle.

It is common to provide a side impact air bag assembly in the vehicle seat by mounting the air bag assembly or module to the seat bottom or seat back frame. However, the air bag is typically mounted behind a layer of foam cushion and fabric trim cover of the seat assembly. Therefore, during a vehicle side collision, the air bag must explode from the seat assembly and eject through the layer of foam cushion and trim cover, thus, permanently damaging the construction of the seat assembly and possibly interfering with the air bag deployment process, i.e. time or pattern.

Further, it is desirable to have a seat assembly with a readily accessible air bag assembly to facilitate repair or replacement of the air bag assembly after activation without causing damage to the seat assembly.

SUMMARY OF THE INVENTION AND ADVANTAGES

A vehicle seat assembly comprising a generally horizontal seat bottom and a generally upright seat back coupled to the seat bottom wherein each of the seat bottom and seat back include a contoured foam cushion encased by a trim cover. At least one of the seat bottom and seat back have an opening passing through the foam cushion and trim cover. The seat assembly is characterized by a trim ring having an outwardly extending lip and a flange extending downwardly from the lip. The flange extends partially into the opening to contain the foam and the lip extends around the perimeter of the opening and is fixedly secured to the trim cover for providing a rigid entrance into the opening spaced from the foam cushion and trim cover in one of the seat bottom and seat back.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a cross-sectional view taken through line 4—4 of FIG. 3;

FIG. 7 is an exploded perspective view of the vehicle sweat back assembly; and

DETAILED DESCRIPTION OF THE PREFERRED EMBODIMENT

Referring to the Figures, wherein like numerals reference like or corresponding parts throughout the several views, an automotive vehicle seat assembly is general shown at 10. The seat assembly 10 comprises a generally horizontal seat bottom 12 upon which an occupant sits, and a generally upright seat back 14 coupled to the seat bottom 12 by a hinge mechanism 16. The hinge mechanism 16 provides pivotal fore and aft movement of the seat back 14 relative to the seat bottom 12.

Figure 1:
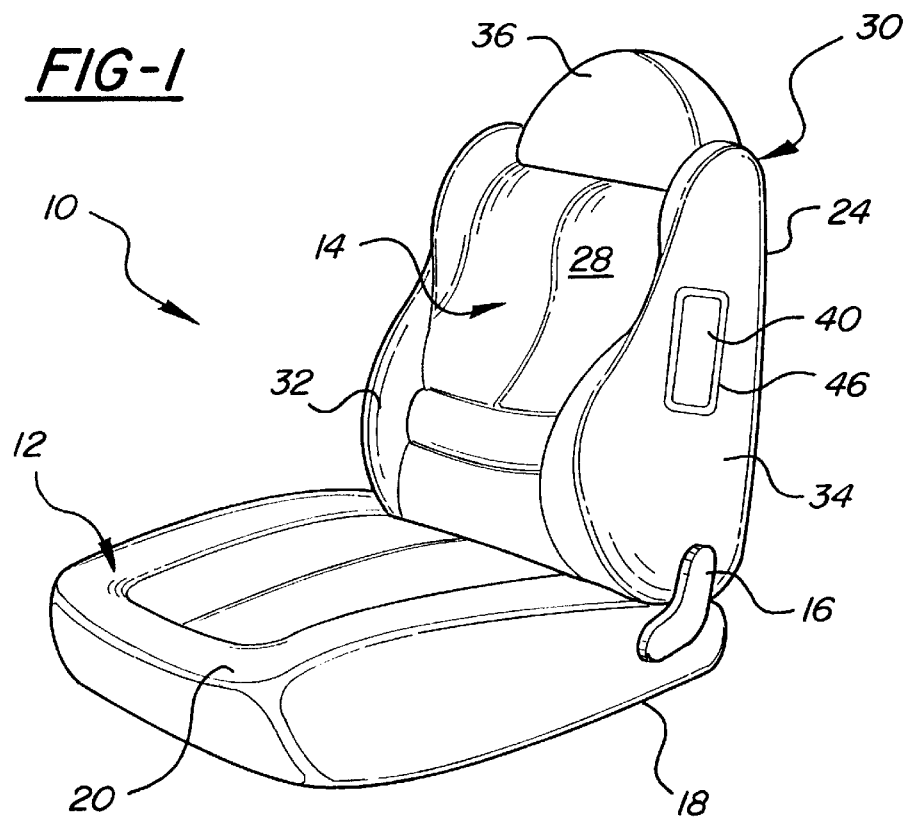
FIG. 1 is a perspective view of a vehicle seat assembly according to the subject invention.

Referring to FIGS. 1 and 7, the seat assembly 10 is further shown. The seat bottom 12 includes a rigid seat bottom frame (not shown), usually made of tubular metal as commonly known in the art. The seat bottom frame supports a contoured foam cushion 18 which is encased in a trim cover 20. Similarly, the seat back 14 includes a rigid seat back frame 22, also of tubular metal construction. The seat back frame 22 supports a contoured foam cushion 24 which is encased in a trim cover 26. The foam cushions 18, 24 are commonly made of polyester or other resilient foam material common in the automotive seating art. Further, the trim covers 20, 26 typically include upholstery of cloth fabric, vinyl or leather.

The seat back 14 further includes a front surface 28, a rear surface 30 and a pair of bolsters 32,34. The bolsters 32,34 are formed on opposing sides of the front 28 and rear 30 surfaces of the seat back 14 for supporting the lateral sides of the seat occupant. The seat assembly 10 also includes a headrest 36 secured to the top portion of the seat back 14.

Figure 2:
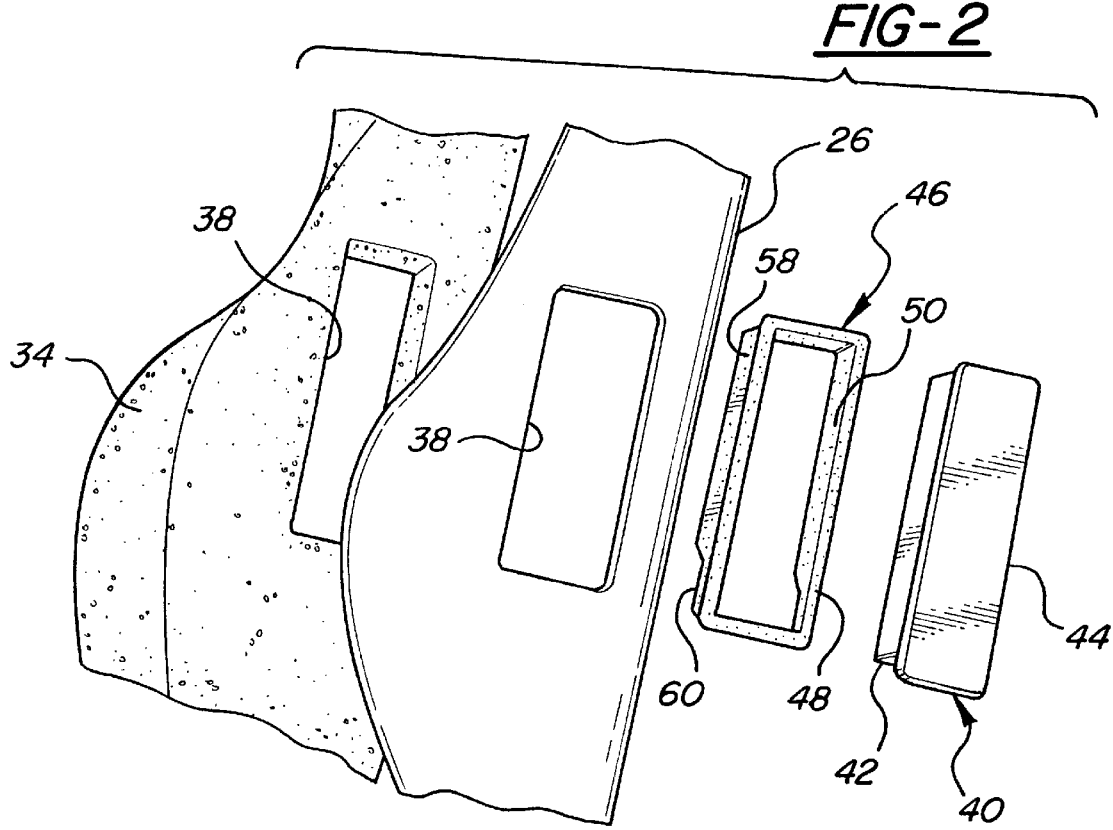
FIG. 2 is an exploded view of a side bolster section of the vehicle seat assembly.

Referring to FIGS. 1 and 2, the seat back 14 includes a generally rectangular opening 38 which passes completely through the layers of foam cushion 24 and trim cover 26. The opening 38 provides access or exposure to the seat back frame 22 positioned behind the layer of foam cushion 24 and trim cover 26. It should be appreciated that the opening 38 may vary in size and shaped from that shown in the preferred embodiment. Further, the opening may be located along portions of the seat back 14 as shown, seat bottom 12 or headrest 36.

The preferred embodiment of FIGS. 1, 2 and 7 disclose the opening 38 in the upper portion of one of the side bolster sections 32, 34 of the seat back 14 to expose or provide access to the seat back frame 22.

The seat assembly 10 further includes a side impact air bag module 40 received in the opening 38 and disposed in the side bolster 34 of the seat back 14. The side impact air bag module 40 may be of the type commonly known in the automotive industry similar to that shown in U.S. Pat. No. 5,419,579 by TRW Vehicle Safety Systems Inc., the disclosure of which is incorporated by reference herein. Referring to FIG. 2, the air bag module 40 includes a generally rectangular body portion 42 which is received in the opening 38 and a top cover 44 which protrudes outwardly from the base to abut the perimeter of the opening 38 and prevent the module 40 from passing therethrough.

The assembly 10 is characterized by including a trim ring 46 which extends partially into the opening 38 and is fixedly secured to the trim cover 26 for providing a rigid entrance into the opening 38 spaced from the foam cushion 24 and trim cover 26 for receiving the side impact air bag module 40. More specifically, referring to FIGS. 2–6, the trim ring 46 includes a generally rectangular configuration corresponding to the shape of the opening 38 and having an outwardly extending lip 48 around the perimeter thereof and a flange 50 extending downwardly from the lip 48. The flange 50 extends generally perpendicular from the lip 48 and forms a generally L-shaped configuration therewith in cross-section. The flange 50 extends partially into the opening 38 and the lip extends around the perimeter of the opening 38.

Figure 3:
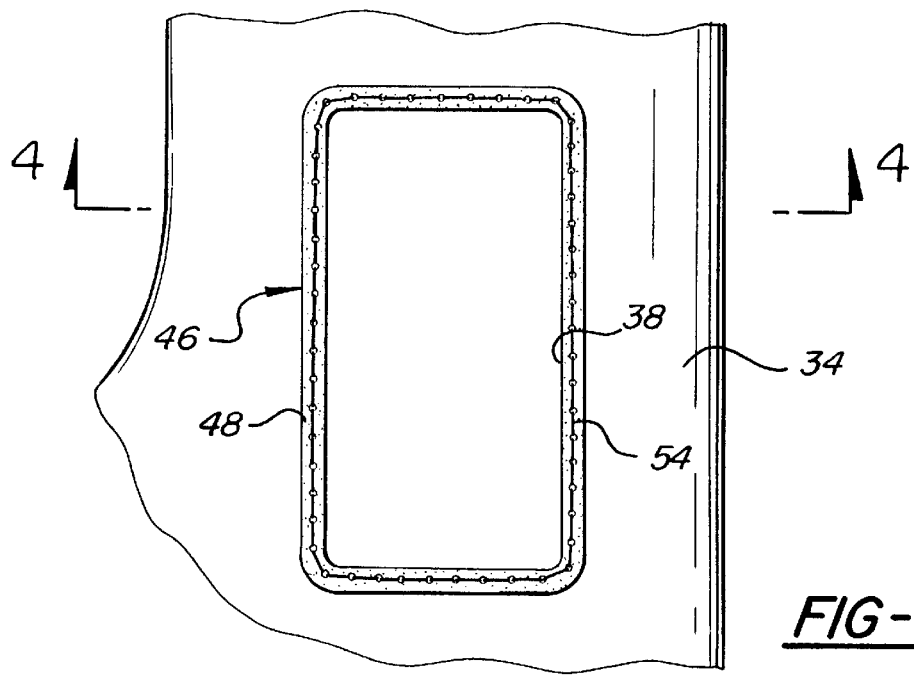
FIG. 3 is a side view of a trim ring and opening in the side bolster section according to the subject invention.

The trim ring 46 consists of a polypropylene material. The lip 48 of the trim ring 36 is fixedly secured to the trim cover 26 by a plurality of threaded stitches commonly referred to as surface stitches 54, as shown in FIG. 3. Further, as shown in FIG. 4, the trim cover 26 includes a peripheral edge 56 around the perimeter of the opening 38 which is fixedly secured by the stitches 54 between the trim ring 46 and foam cushion 24.

Figure 5:
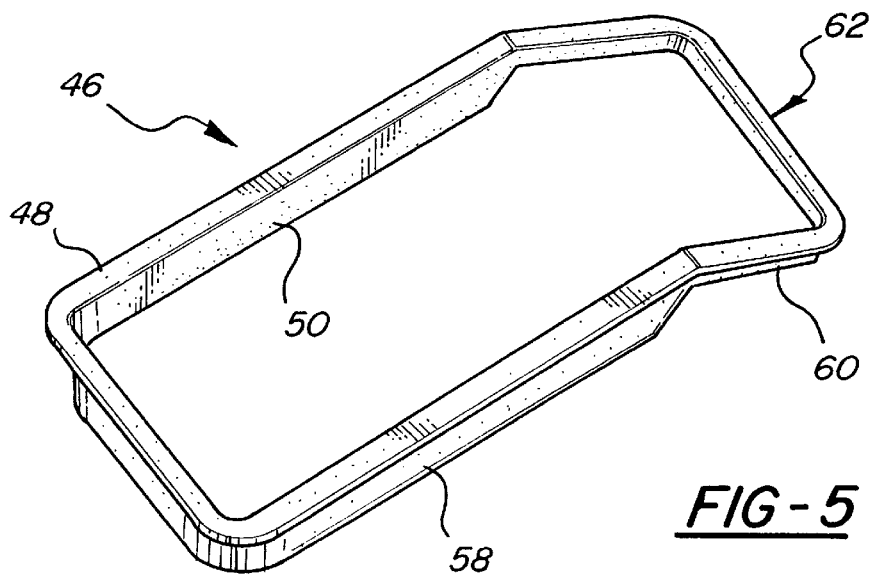
FIG. 5 is a perspective view of the trim ring according to the subject invention.
Figure 6:
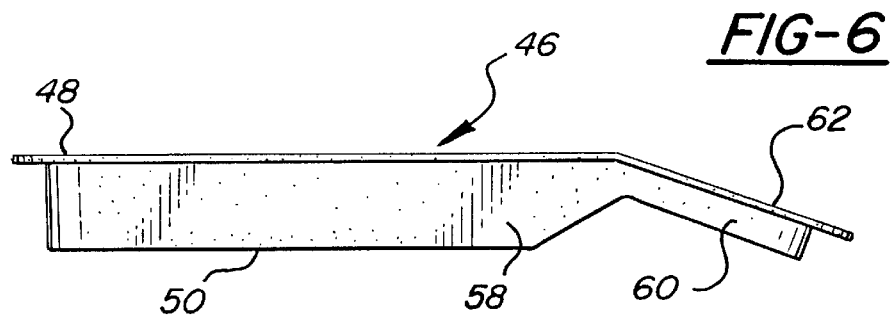
FIG. 6 is a side view of the trim ring of FIG. 5.

Referring to FIGS. 5 and 6, the flange 50 of the trim ring 46 includes a first portion 58 with a predetermined length extending partially into the opening 38 and a second portion 60 having a predetermined length less than the length of the first portion 58 and also extending partially into the opening 38. The first portion 58 of the flange 50 is approximately one-half the length, or thickness, of the layer of foam cushion 24. Further, the second portion 60 is approximately one-half the length of the first portion 58. More specifically, the trim ring 46 of the preferred embodiment of FIG. 6 discloses the lip 48 having a thickness of 2 mm, the first portion 58 of the flange 50 having a length of 10 mm and the second portion 60 having a length of 5 mm. Further, one end 62 of the trim ring 46 extends downwardly at a predetermined angle from the remaining end of the trim ring 46. The shape of the trim ring 46 is dictated and corresponds to the general shape and configuration of the air bag module 40 to receive the same therein. It should be appreciated, therefore, that the shape and configuration of the trim ring 46 may vary from that shown in the preferred embodiment according to the shape and configuration of the air bag module 40.

Figure 8:
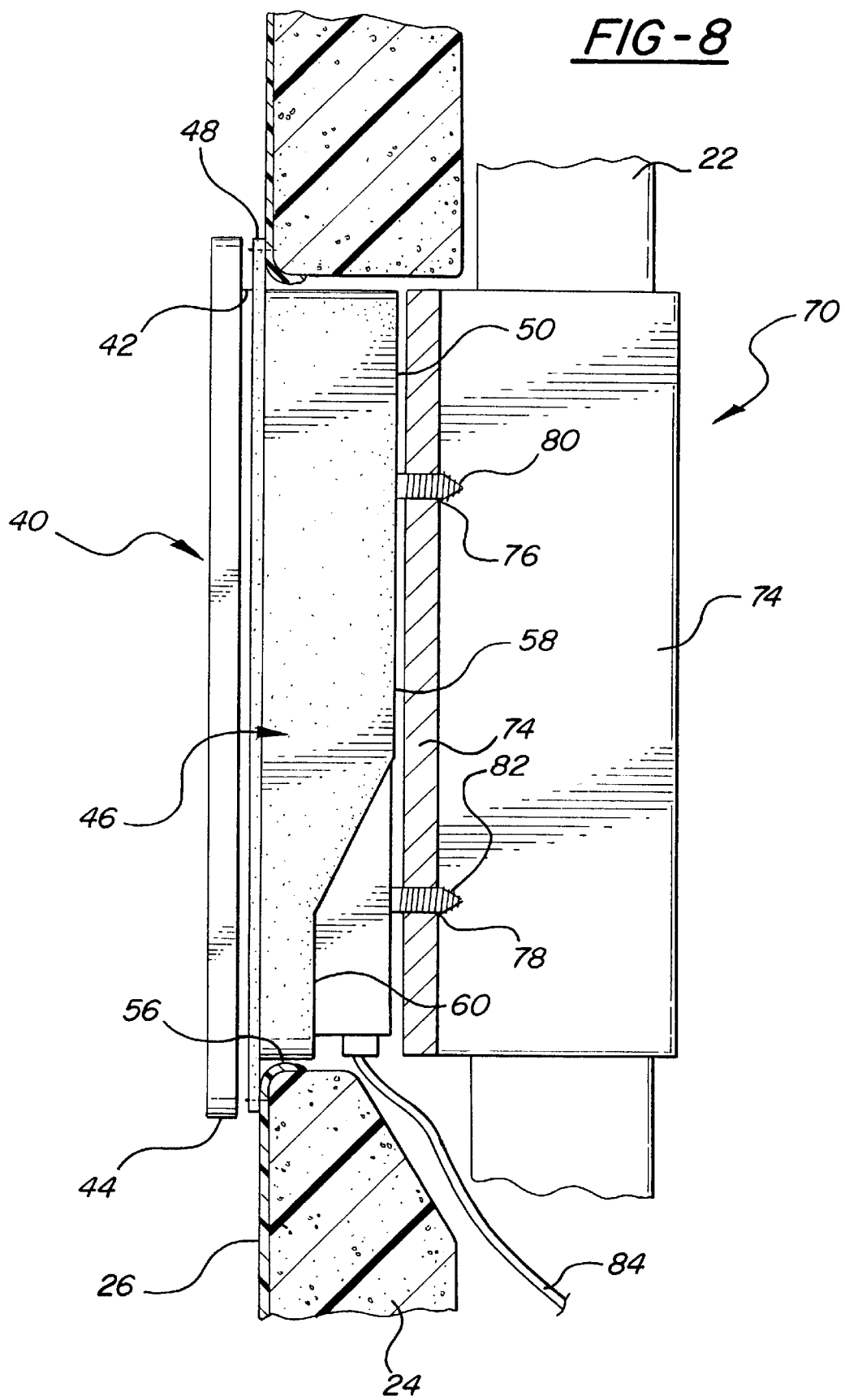
FIG. 8 is a side view of the trim ring and air bag module connected to the seat frame according to the subject invention.

Finally, referring to FIGS. 7 and 8, the seat back frame 22 consists of a tubular metal frame forming a generally U-shaped support structure. The seat back frame 22 includes a generally L-shaped bracket 70 fixedly secured by welds, or the like, to a section of the tubular frame adjacent the seat back side bolster section 32. The bracket 70 includes a base plate 72 mounted to the seat back frame 22 and an outwardly extending mounting plate 74 which is positioned immediate behind and adjacent to the opening 38 in the side bolster 32. The mounting plate 74 includes a pair of apertures 76,78 therethrough. The seat back side bolster 32 including the foam cushion 24 and trim cover 26 is positioned onto the seat back frame 22 with the opening 38 aligned with the mounting plate 74 of the bracket 70. The trim ring 46 is secured to the trim cover 26 and extends from the outer surface of the seat back 14 into the opening 38. The trim ring 46 is spaced from the layer of foam cushion 24 and trim cover 26 to ensure that portions of the cushion 24 and cover 26 do not extend into or interfere with the opening 38.

The side impact air bag module 40 includes a pair of fasteners 80,82, generally of the type referred to as "Christmas tree" fasteners, extending outwardly from the bottom of the body portion 42 of the module 40. The module is received in the opening 38 and the top cover 44 abuts the lip 48 of the trim ring 46 to compress the foam cushion 24 toward the seat back frame 22 until the fasteners 80,82 are received into the apertures 76,78 to fixedly secure the module 40 to the bracket 70. With the foam cushion 24 compressed toward the seat back frame 22, the bottom edge of the first portion 58 of the trim ring 46 abuts against the surface of the mounting plate 74 of the bracket 70 to provide a rigid opening in the side bolster 32 of the seat back 14.

As shown in FIG. 8, a small clearance or gap of approximately 3 mm exists between the sides of the body portion 42 of the module 40 and the flange 50 of the trim ring to provide sufficient clearance or tolerance for insertion of the module 40 through the opening 38. Further, the second portion 60 of the trim ring 46 having a length less than the length of the first portion 58 allow for an electrical wiring harness 84 to pass partially through the bottom portion of the opening 38 for connection with the air bag module 40 without interfering with the rigid entrance of trim ring 46. More specifically, the first portion 58 of the trim ring 46 abuts against the mounting plate 74 of the bracket 70 and the second portion 60 is spaced therefrom leaving a gap for passage of the electrical wiring harness 84 to the module 40.

Alternatively, the mounting plate 74 of the bracket 70 may be slightly smaller than the opening 38 and thus only engage a portion of the trim ring 46 while abutting the module 40 and locking the fasteners 80,82 into the apertures 76,78.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practice otherwise than as specifically described.

What is claimed is:

1. A vehicle seat assembly comprising:
   a generally horizontal seat bottom;
   a generally upright seat back coupled to said seat bottom;
   each of said seat bottom and said seat back including a contoured foam cushion encased by a trim cover;
   at least one of said seat bottom and seat back having an opening passing through said foam cushion and said trim cover; and
   a trim ring having an outwardly extending lip and a flange extending generally perpendicularly downwardly from said lip, said flange extending partially into said opening and said lip extending around the perimeter of said opening and fixedly secured to said trim cover for providing a rigid entrance into said opening in one of said seat bottom and said seat back; said trim cover having a peripheral edge fixedly secured between said trim ring and said foam cushion.

2. A vehicle seat assembly as set forth in claim 1 further characterized by said flange of said trim ring having a first portion with a predetermined length extending partially into said opening and a second portion having a predetermined length less than said length of said first portion and extending partially into said opening.

3. A vehicle seat assembly as set forth in claim 1 further characterized by said lip of said trim ring fixedly secured by threaded stitches to said trim cover.

4. A vehicle seat assembly as set forth in claim 3 further characterized by said threaded stitches including a surface stitch between said lip and said trim cover.

5. A vehicle seat assembly as set forth in claim 4 further characterized by said trim ring consisting of a polypropylene material.

6. A vehicle seat assembly as set forth in claim 5 further characterized by said seat back having a front surface, a rear surface and a bolster section on opposing sides of said front and rear surfaces.

7. A vehicle seat assembly as set forth in claim 6 further characterized by said opening passing through one of said side bolster sections in said seat back.

8. The vehicle seat assembly comprising:

a generally horizontal seat bottom;

a generally upright seat back coupled to said seat bottom;

each of said bottom and said seat back including a contoured foam cushion encased by a trim cover;

at least one of said seat bottom and seat back having an opening passing through said foam cushion and said trim cover;

a trim ring having an outwardly extending lip and a flange extending downwardly from said lip, said flange extending partially into said opening and said lip extending around the perimeter of said opening and fixedly secured to said trim cover for providing a rigid entrance into said opening; and said flange of said trim ring having a first portion with a predetermined length extending partially into said opening and a second portion having a predetermined length less than said length of said first portion and extending partially into said opening.

9. A vehicle seat assembly comprising:

a generally horizontal seat bottom and a generally upright seat back coupled to said seat bottom;

said seat bottom including a rigid seat bottom frame supporting a contoured foam cushion and said foam cushion encased in a trim cover;

said seat back including a rigid seat back frame supporting a contoured foam cushion and said foam cushion encased in a trim cover;

at least one of said seat bottom and said seat back having an opening passing through said foam cushion and said trim cover to expose one of said seat bottom frame and said seat back frame respectively;

a side impact air bag module; and a trim ring having a flange extending partially into said opening and fixedly secured to said trim cover for providing a rigid entrance into said opening for receiving said side impact air bag module therein.

10. A vehicle seat assembly as set forth in claim 9 further characterized by said side impact air bag module extending through said opening and fixedly secured to one of said seat bottom frame and said seat back frame.

11. A vehicle seat assembly as set forth in claim 10 further characterized by said trim ring having an outwardly extending lip and said flange extending downwardly from said lip, and said lip extending around the perimeter of said opening and fixedly secured to said trim cover.

12. A vehicle seat assembly as set forth in claim 11 further characterized by said lip of said trim cover fixedly secured by threaded stitches to said trim cover.

13. A vehicle seat assembly as set forth in claim 12 further characterized by said threaded stitches including a surface stitch between said lip and said trim cover.

14. A vehicle seat assembly as set forth in claim 13 further characterized by said flange of said trim ring having a first portion with a predetermined length extending partially into said opening and a second portion having a predetermined length less than said length of said first portion and extending partially into said opening.

15. A vehicle seat assembly as set forth in claim 14 further characterized by said trim cover having a peripheral edge fixedly secured between said trim ring and said foam cushion.

16. A vehicle seat assembly as set forth in claim 15 further characterized by said trim ring consisting of a polypropylene material.

17. A vehicle seat assembly as set forth in claim 16 further characterized by said seat back having a front surface, a rear surface and a bolster section on opposing sides of said front and rear surfaces.

18. A vehicle seat assembly as set forth in claim 17 further characterized by said opening passing through one of said side bolster sections of said seat back.

19. A vehicle seat assembly as set forth in claim 18 further characterized by said seat back frame including a bracket for receiving and securing said air bag module in said opening to said seat back frame.

20. A vehicle seat assembly as set forth in claim 19 further characterized by said bracket having at least one aperture and said air bag module having at least one fastener, said aperture receiving and securing said fastener and said module to said bracket.

* * * * *